Figure 1:
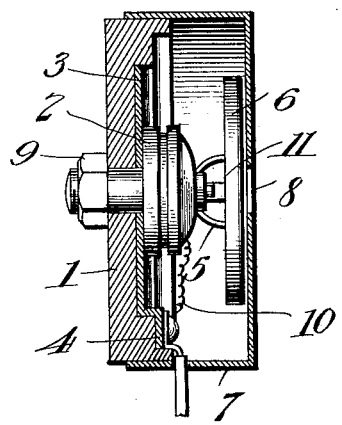

F. GOTTSCHALK.
DEVICE FOR DETECTING MECHANICAL VIBRATION.
APPLICATION FILED JAN. 15, 1914.

1,137,478.

Patented Apr. 27, 1915.
3 SHEETS—SHEET 1.

Inventor
Felix Gottschalk

Witnesses

By
Attorney

F. GOTTSCHALK.
DEVICE FOR DETECTING MECHANICAL VIBRATION.
APPLICATION FILED JAN. 15, 1914.

1,137,478.

Patented Apr. 27, 1915.
3 SHEETS—SHEET 2.

Inventor
Felix Gottschalk

Witnesses

By H. R. Van Deventer
Attorney

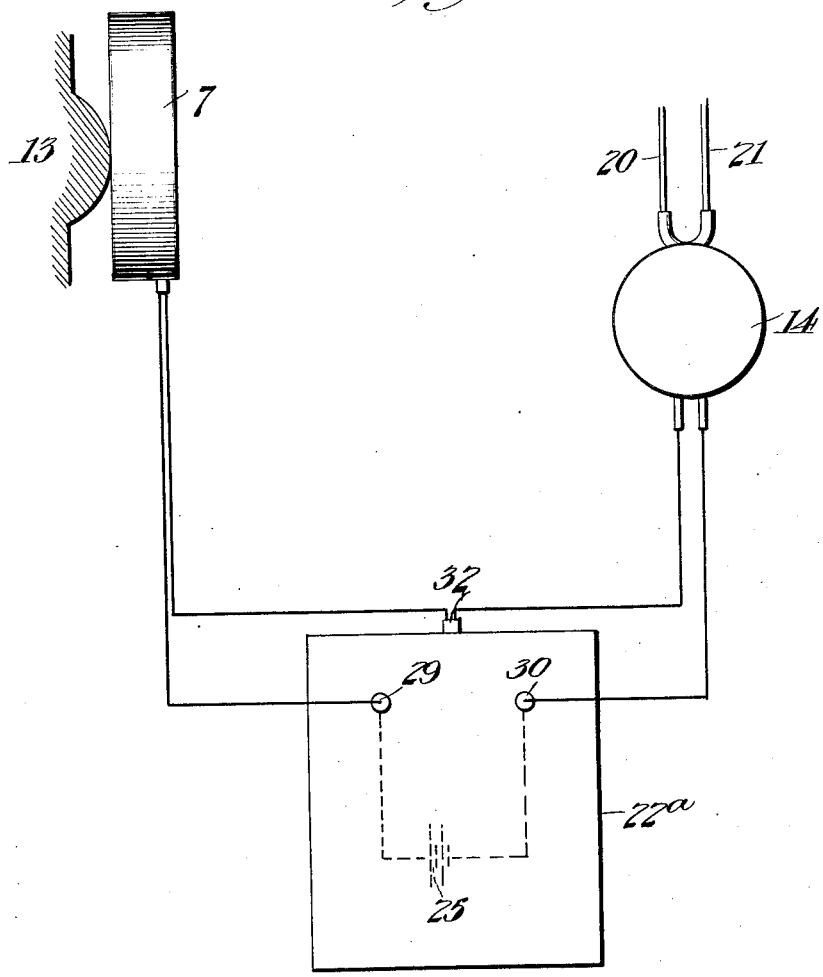

UNITED STATES PATENT OFFICE.

FELIX GOTTSCHALK, OF STIRLING, NEW JERSEY.

DEVICE FOR DETECTING MECHANICAL VIBRATION.

1,137,478. Specification of Letters Patent. Patented Apr. 27, 1915.

Application filed January 15, 1914. Serial No. 812,266.

*To all whom it may concern:*

Be it known that I, FELIX GOTTSCHALK, a citizen of the United States, residing at Stirling, in the county of Morris and State of New Jersey, have invented certain new and useful Improvements in Devices for Detecting Mechanical Vibration, of which the following is a specification, reference being had to the accompanying drawing.

My invention relates to means for electrically detecting mechanical vibrations, such as the heart-beats of living things, minute relative movements between parts of machines commonly referred to as "knocks," and other localized vibrations. I obtain improved results by varying the current flow through my improved apparatus by the direct action of mechanical vibrations. Others have heretofore attempted to achieve this end through the medium of sound waves, as utilized in the usual telephone transmitter or microphone, but the difficulties with such devices are such that they have a very limited field—especially when used as stethoscopes—whereas my invention is especially adapted to such uses.

To more fully point out the advantages of my invention, it is necessary to compare it with the usual form of microphonic telephone transmitter. The transmitter has a diaphragm adapted to collect the sound waves which impinge thereon. The mechanical movement of this diaphragm in turn acts upon a variable resistance medium, the changes in resistance of which vary the current flowing, and thereby affect the diaphragm of a suitable receiver. Such devices are first open to the serious objection that a large portion of the force of the original mechanical vibration is lost in the air between the object and the transmitter diaphragm, and even if the diaphragm is placed in actual physical contact with the object, there are details of construction in all transmitters except mine that would prevent them from receiving faint vibrations through mechanical contact. That there is a great loss in transferring the mechanical vibrations to the instrument through the air, can be proven by placing my device upon a table, with a watch or other device capable of producing regular and minute mechanical vibrations. The watch may now be drawn slowly away from my device to a distance of two or three feet, but the vibrations will be entirely audible in the receiver of my device. If the watch is now removed from the table so that the mechanical vibrations therefrom must pass through the air to reach my device, even a quarter of an inch air space will render the vibrations inaudible.

Should both the above experiments be repeated with the ordinary microphone transmitter it will be observed that same will operate with the watch in both positions, but best with the watch nearest in either position, showing that it is sensitive to vibrations collected by its diaphragm, either from direct contact (ineffectually) or from the air (more effectually), whereas my device is particularly susceptible to direct contact mechanical vibrations, and but slightly if at all affected by sound vibrations passing between it and the object. It will also be noted that, owing to my improved construction, adapted for direct contact, the loss due to air-transferred is eliminated, while the extraneous noises always present and which are collected and magnified by the usual diaphragm microphone, are eliminated.

While my invention consists principally in the construction of the transmitter, it also has the further objects of enabling the sound of the minute mechanical vibration to be considerably amplified in the receiver by increasing the strength of the source of current without the distortion, lack of clearness, or frying noises which attend such procedure when the usual microphone is used.

My construction also enables a very compact and efficient stethoscope to be constructed, embracing a suitable battery, connections, transmitter, receiver and ear tubes.

As my transmitter construction affords sufficient volume, a number of receivers may be connected in any suitable manner to the circuit and satisfactory results secured. For instance, at a surgical clinic, a number of those present can listen at the same time to the heart beats of the same patient, all receivers being operated by the same transmitter and controlled by any suitable switching device located in either the primary or secondary circuit.

To illustrate my invention, I will describe same as applied to a portable stethoscope as used by physicians, and to detect small vibrations in machinery.

Figure 2:
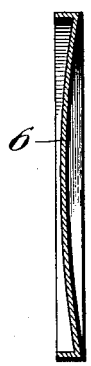
Figure 3:
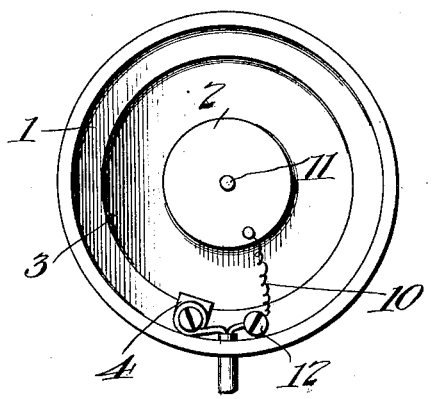
Figure 4:
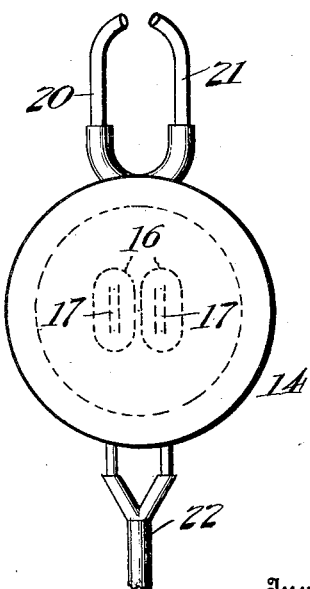
Figure 5:
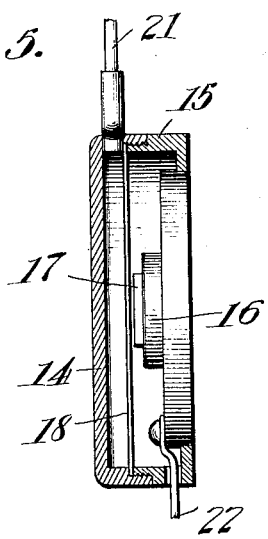
Figure 6:
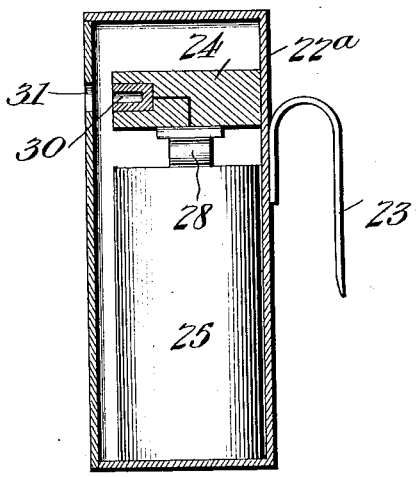
Figure 7:
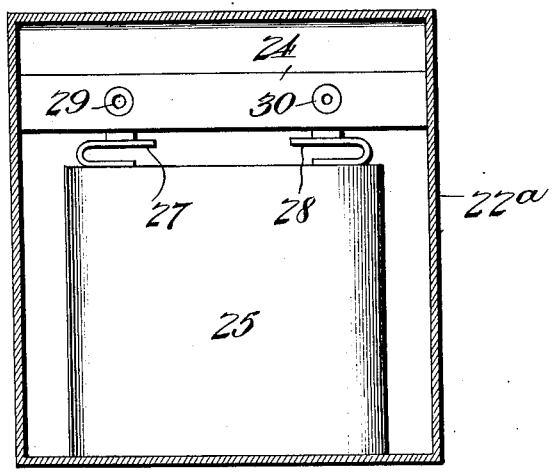

Figure 1 is a sectional view of the transmitter. Fig. 2, a sectional view of the vibratory member used in the transmitter. Fig. 3, a front view of the transmitter with the vibratory member removed. Fig. 4, a special form of receiver. Fig. 5, a side view in section of the receiver. Fig. 6, a side view of the battery case. Fig. 7, a front view of the same. Fig. 8, a diagram of connections.

Like figures of reference denote the same parts wherever they are shown.

1 denotes the rear casing of the transmitter which supports the usual cell 2 carrying the two electrodes and variable resistance medium. The cell is held in the casing 1, by the nut 9. This structure can be varied within wide limits, and may consist of any well known form of transmitter cell. Interposed between the rear casing 1 and the cell 2 is a metallic plate 3, which has an extension ear, forming the terminal 4 to which one of the circuit wires may be connected.

5 is a spider-shaped member connecting one of the cell-electrodes—the front one in this type of cell—with a plate-shaped vibratory member 6, which is carried solely by the spider, having its outer edge entirely free.

All of the foregoing parts are inclosed by a casing 7, which may have an aperture 8 at its front, although this is not strictly necessary.

10 is a wire connecting the front electrode, the stem of which is shown at 11, with the terminal 12.

The weight of the vibratory member 6 and the shape of its flanged rim or edge, varies with different cells, and may be proportioned to meet various requirements. A weight alone on the front electrode will not suffice, nor will a flat diaphragm,—especially if secured at its edge. The peculiar convex shape shown is necessary to produce the best results, as upon the vibrations of this member the efficiency of the device depends. I find it desirable in some cases to spin this member, so as to make the metal of which it is composed of a different thickness at the center and edge. It must be understood this member is not a sound receiving diaphragm, but simply acts as a tuned amplifier or resonator in relation to the cell and the balance of the instrument.

The casing 7, or any part of the transmitter being placed in direct contact with the object to be observed—for instance the bearing 13, vibrations will pass from 13 to 7, to cell 2, and to the vibratory member 6. The latter by reason of its property of amplification, reinforces and strengthens these vibrations, thereby increasing the variable action of the transmitter cell 2, in the usual manner, on the current flowing. The receiver used with a transmitter of this description should possess certain features, as shown in Figs. 4 and 5 to produce the maximum results. 14 is a non-perforate cap, completely inclosing the front of the case 15 carrying the coils, pole pieces and diaphragm 16, 17, and 18. A U-shaped conduit is provided, as shown, to which is connected the usual ear tubes 20 and 21. Suitable electrical connections, such as the cords 22 are provided. A receiver of this character is preferred by some to the usual double head receiver, and is of peculiar advantage when used in connection with my improved transmitter as a stethoscope.

Figs. 6 and 7 show the preferred form of battery case. 22ᵃ is a casing, having a hook or other suitable member 23 whereby it may be hung up or pinned to the clothing. A terminal rack 24 is provided for the battery cells 25, the terminals 27 and 28 of which connect to the terminals 29 and 30 on the terminal rack, which are adapted to receive the ordinary pin connectors on the transmitter and receiver cords. Suitable holes 31 in the outer casing are provided for the cord connectors.

The three pieces of apparatus just described, may be connected together in any suitable manner. Fig. 8 shows them connected in series. An extra terminal 32 may be mounted on the battery case to enable the transmitter and receiver cords to be joined. This arrangement makes a compact and efficient light-weight stethoscope, and by having the socket terminals of different sizes and the various pin-connectors to correspond, it is impossible to improperly connect the apparatus.

I claim—

1. In an apparatus of the character described, a transmitter cell, a stem projecting from said cell, a vibratory member comprising a concave plate shaped disk, having a rearwardly projecting flange carried on said stem and a casing completely closing and surrounding said cell and vibratory member and thereby shielding same from the direct action of sound waves, substantially as described.

2. In an apparatus of the character described, a vibratory member comprising a concave plate shaped disk having a rearwardly projecting flanged portion, a spider shaped member 5, the ends of which are attached to said vibratory member at interperipheral points on the latter, and a resistance cell supporting said vibratory member and spider, substantially as described.

3. In an apparatus of the character described, a vibratory member having a flanged edge, the true flanged portion of which is substantially at right angles to the normal plane of the vibratory member and free to vibrate therewith.

4. In an apparatus of the character described, a free vibrating member having a flanged periphery.

5. In an apparatus of the character described, a vibratory member having a curved surface in combination with a flanged edge, said flange being substantially at right angles to the plane of the body of said member.

6. In an apparatus of the character described, a diaphragm having a curved surface and an edge portion flanged at an angle to said surface and means for interperipherally mounting said diaphragm in a free vibrating position.

In testimony whereof I hereunto affix my signature in the presence of two witnesses.

FELIX GOTTSCHALK.

Witnesses:
CHAS. LUBRECHT,
W. J. LOWRIE.